US012654193B2

(12) United States Patent
Gao et al.

(10) Patent No.: US 12,654,193 B2
(45) Date of Patent: Jun. 16, 2026

(54) MATERIAL RECONDITIONING AND DISPENSING SYSTEM

(71) Applicant: GM GLOBAL TECHNOLOGY OPERATIONS LLC, Detroit, MI (US)

(72) Inventors: Dalong Gao, Rochester, MI (US); Prateek Mishra, Rochester, MI (US); Paul E. Crittenden, Metamora, MI (US); Ryan Gergely, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 377 days.

(21) Appl. No.: 18/329,910

(22) Filed: Jun. 6, 2023

(65) Prior Publication Data

US 2024/0408639 A1 Dec. 12, 2024

(51) Int. Cl.
*B05C 5/02* (2006.01)
*B05C 11/10* (2006.01)

(52) U.S. Cl.
CPC ........ *B05C 5/0225* (2013.01); *B05C 11/1013* (2013.01)

(58) Field of Classification Search
CPC .......................... B05C 5/0225; B05C 11/1013
See application file for complete search history.

(56) References Cited

U.S. PATENT DOCUMENTS

| | | | | | |
|---|---|---|---|---|---|
| 4,865,459 | A * | 9/1989 | Yamada | B01F 33/862 | 366/270 |
| 5,054,650 | A * | 10/1991 | Price | B05B 12/085 | 222/1 |
| 5,094,399 | A * | 3/1992 | Zaber | B05B 9/002 | 239/332 |
| 5,499,745 | A * | 3/1996 | Derian | B05C 11/10 | 222/145.6 |
| 7,429,299 | B2 * | 9/2008 | McGlinchy | B05C 5/0216 | 118/712 |
| 2022/0379274 | A1 * | 12/2022 | Shi | B01F 27/272 | |

OTHER PUBLICATIONS

U.S. Appl. No. 17/879,851, filed Aug. 3, 2022, Gao et al.

* cited by examiner

*Primary Examiner* — Jeremy Carroll

(57) ABSTRACT

A dispensing system for dispensing a material to a deposition point, the dispensing system including: a nozzle configured to dispense the material; a doser in fluid communication with the nozzle, the doser configured to control flow of the material to the nozzle; and a material conditioning assembly in fluid communication with the nozzle and configured to decrease viscosity of the material. The material conditioning assembly including: a conditioning chamber configured to receive the material therein; a drive member movable within the conditioning chamber to apply shear stress to the material within the conditioning chamber; and an actuator configured to move the drive member.

15 Claims, 6 Drawing Sheets

MATERIAL RECONDITIONING AND DISPENSING SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a material reconditioning and dispensing system.

Various manufacturing processes include adhesives and other materials that are dispensed under specific conditions. Dispensing systems transport the materials from storage containers to a deposition site, such as on an assembly line. At the dispensing site, the dispensing system deposits the material at specific locations and in specified quantities.

SUMMARY

The present disclosure includes, in various features, a dispensing system for dispensing a material to a deposition point, the dispensing system including: a nozzle configured to dispense the material; a doser in fluid communication with the nozzle, the doser configured to control flow of the material to the nozzle; and a material conditioning assembly in fluid communication with the nozzle and configured to decrease viscosity of the material. The material conditioning assembly including: a conditioning chamber configured to receive the material therein; a drive member movable within the conditioning chamber to apply shear stress to the material within the conditioning chamber; and an actuator configured to move the drive member.

In further features, the material conditioning assembly is in fluid communication with the doser and arranged in the dispensing system such that the material flows from the material conditioning assembly to the doser.

In further features, the drive member is a piston.

In further features, the conditioning chamber is a first conditioning chamber and the drive member is a first drive member; and the material conditioning assembly further includes a second conditioning chamber and a second drive member movable within the second conditioning chamber to apply shear stress to the material within the second conditioning chamber.

In further features, a primary chamber in fluid communication with both the first conditioning chamber and the second conditioning chamber to allow the material to flow between the first conditioning chamber and the second conditioning chamber by way of the primary chamber.

In further features, the primary chamber is in fluid communication with the doser and a source of the material; both the first conditioning chamber and the second conditioning chamber are in fluid communication with the doser by way of the primary chamber; and a stop valve is at an outlet of the primary chamber, the stop valve configured to stop flow of the material to the doser when the stop valve is closed.

In further features, the actuator is configured to simultaneously move both the first drive member and the second drive member in opposite directions to apply shear stress to the material.

In further features, helical grooves are defined at an inner surface of at least one of the first conditioning chamber and the second conditioning chamber.

In further features, at least one of the first conditioning chamber and the second conditioning chamber is nonlinear.

In further features, a control module is configured to determine viscosity of the material based on speed of the drive member and power consumed by the actuator to move the drive member when the conditioning chamber is full of the material.

In further features, when the determined viscosity is higher than a predetermined target viscosity, the control module is configured to increase power to the actuator to accelerate the drive member and apply additional shear stress to the material; and when the determined viscosity is lower than the predetermined target viscosity, the control module is configured to decrease power to the actuator to decelerate the drive member and apply less shear stress to the material.

In various features, the present disclosure includes a dispensing system for dispensing a material to a deposition point. The dispensing system includes: a nozzle configured to dispense the material; a doser in fluid communication with the nozzle, the doser including a displacement rod and a motor configured to move the displacement rod to control flow of the material to the nozzle; a material conditioning assembly upstream of the doser such that the material flows from the material conditioning assembly to the doser. The material conditioning assembly includes: a conditioning chamber configured to receive the material therein; a drive member movable within the conditioning chamber to apply shear stress to the material within the conditioning chamber; and an actuator configured to move the drive member. A control module is configured to determine viscosity of the material based on speed of the drive member and power consumed by the actuator to move the drive member when the conditioning chamber is full of the material. When the viscosity determined by the control module is higher than a predetermined target viscosity, the control module is configured to increase power to the actuator to accelerate the drive member to apply additional shear stress to the material.

In further features, the control module is configured to increase power to the motor to actuate the displacement rod with increased force when the viscosity of the material determined by the control module is higher than the predetermined target viscosity; and the control module is configured to decrease power to the motor to actuate the displacement rod with decreased force when the viscosity of the material determined by the control module is lower than the predetermined target viscosity.

In further features, the conditioning chamber is a first conditioning chamber and the drive member is a first drive member; the material conditioning assembly further includes a second conditioning chamber and a second drive member movable within the second conditioning chamber to apply shear stress to the material within the second conditioning chamber; and the conditioning chamber further includes a primary chamber in fluid communication with both the first conditioning chamber and the second conditioning chamber to allow the material to flow between the first conditioning chamber and the second conditioning chamber by way of the primary chamber.

In further features, the primary chamber is in fluid communication with the doser and a source of the material; both the first conditioning chamber and the second conditioning chamber are in fluid communication with the doser by way of the primary chamber; and a stop valve is at an outlet of the primary chamber, the stop valve configured to stop flow of the material to the doser when the stop valve is closed.

In further features, the actuator is configured to simultaneously move both the first drive member and the second drive member in opposite directions to apply shear stress to the material.

In further features, helical grooves are defined at an inner surface of at least one of the first conditioning chamber and the second conditioning chamber.

The present disclosure further includes, in various features, a dispensing system for dispensing a material to a deposition point. The dispensing system includes: a nozzle configured to dispense the material; a doser in fluid communication with the nozzle, the doser configured to control flow of the material to the nozzle; and a material conditioning assembly upstream of the doser such that the material flows from the material conditioning assembly to the doser. The material conditioning assembly includes: a first conditioning chamber and a first drive member movable within the first conditioning chamber to apply shear stress to the material within the first conditioning chamber; a second conditioning chamber and a second drive member movable within the second conditioning chamber to apply shear stress to the material within the second conditioning chamber; an actuator configured to simultaneously move the first drive member and the second drive member in opposite directions to apply shear stress to the material; a primary chamber in fluid communication with both the first conditioning chamber and the second conditioning chamber to allow the material to flow between the first conditioning chamber and the second conditioning chamber by way of the primary chamber, the primary chamber is in fluid communication with the doser and a source of the material; and a stop valve at an outlet of the primary chamber, the stop valve configured to stop flow of the material to the doser when the stop valve is closed.

In further features, a control module is configured to determine viscosity of the material based on speed of the first drive member, speed of the second drive member, and power consumed by the actuator to move the first drive member and the second drive member when the material conditioning assembly is full of the material; and when the determined viscosity is higher than a predetermined target viscosity, the control module is configured to increase power to the actuator to accelerate the first drive member and the second drive member to apply additional shear stress to the material.

In further features, the doser includes a displacement rod and a motor configured to move the displacement rod to control flow of the material to the nozzle; the control module is configured to increase power to the motor to actuate the displacement rod with increased force when the viscosity of the material determined by the control module is higher than the predetermined target viscosity; and the control module is configured to decrease power to the motor to actuate the displacement rod with decreased force when the viscosity of the material determined by the control module is lower than the predetermined target viscosity.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
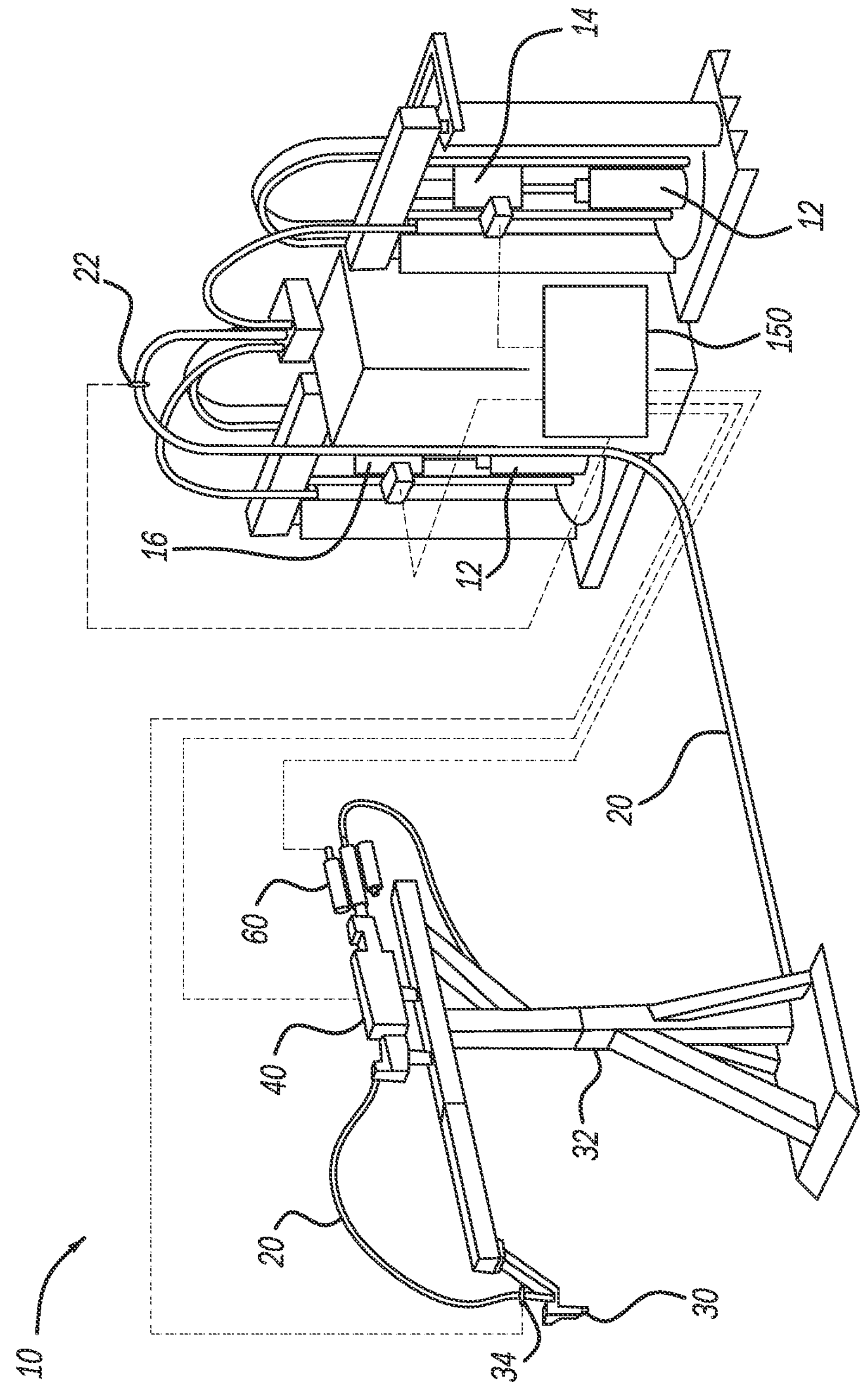
FIG. 1 is a perspective view of a dispensing system in accordance with the present disclosure.

FIG. 1 illustrates an exemplary dispensing system 10 in accordance with the present disclosure. The dispensing system 10 is configured for dispensing any suitable material to a deposition location. The dispensing system 10 may be used in a variety of different applications, such as, but not limited to, manufacturing applications. Suitable manufacturing applications include, but are not limited to, automobile manufacturing. The dispensing system 10 may be used to dispense any suitable material, such as any suitable non-Newtonian material. Exemplary, non-Newtonian materials that may be dispensed using the dispensing system 10 include, but are not limited to, structural adhesives for securing two structural components together, as well as any suitable sealers. With respect to automotive applications, for example, the dispensing system 10 may be used to dispense structural adhesives for securing a vehicle body part to a vehicle frame. The dispensing system 10 may be used to dispense non-Newtonian materials that may become more viscous when stationary. As explained herein, the dispensing system 10 conditions the material to reduce the viscosity thereof and facilitate dispensing of the material at the nozzle 30.

As illustrated in FIG. 1, the dispensing system 10 includes one or more storage containers 12 for storing the material to be dispensed. The storage containers may be 5 gallon drums or 55 gallon barrels, for example. The material is pumped out of the storage containers 12 by a first pump 14 and/or a second pump 16. The material is pumped through fluid lines 20. Along one of the fluid lines 20 is an optional pressure transducer 22, which is configured to measure pressure of the material within the fluid lines 20. The pressure transducer 22 may be located at any other suitable position about the system 10.

The material is pumped through the fluid lines 20 to a nozzle 30, which is configured to dispense the material at the deposition site. The nozzle 30 may be supported on a stand 32. Proximate to the nozzle 30 may be an optional flow transducer 34, which is configured to measure flow velocity of the material flowing to the nozzle 30.

The dispensing system 10 further includes a doser 40 (also known as a meter assembly). With continued reference to FIG. 1, and additional reference to FIG. 2, the doser 40 includes an inlet 42 through which material to be dispensed from the nozzle 30 flows into the doser 40. The doser 40 is upstream of the nozzle 30 such that material to be dispensed through the nozzle 30 first flows through the doser 40. The doser 40 generally controls the amount of material dispensed, as well as the force and velocity at which the material is dispensed.

The doser 40 further includes an outlet 44 through which material exits the doser 40. The doser 40 includes a displacement rod 46 and a head 48 at an end of the displacement rod 46. The displacement rod 46 is actuated by any suitable actuator, such as a servo motor 52. A gearbox 50 connects the servo motor 52 to the displacement rod 46. During operation of the dispensing system 10, the first and/or second pumps 14, 16 pump the material through the fluid lines 20, and through the inlet 42 of the doser 40. Actuation of the displacement rod 46 by the servo 52 pushes the material out of the doser 40 through the outlet 44 and to the nozzle 30, where the material is dispensed at the deposition location.

Figure 2:
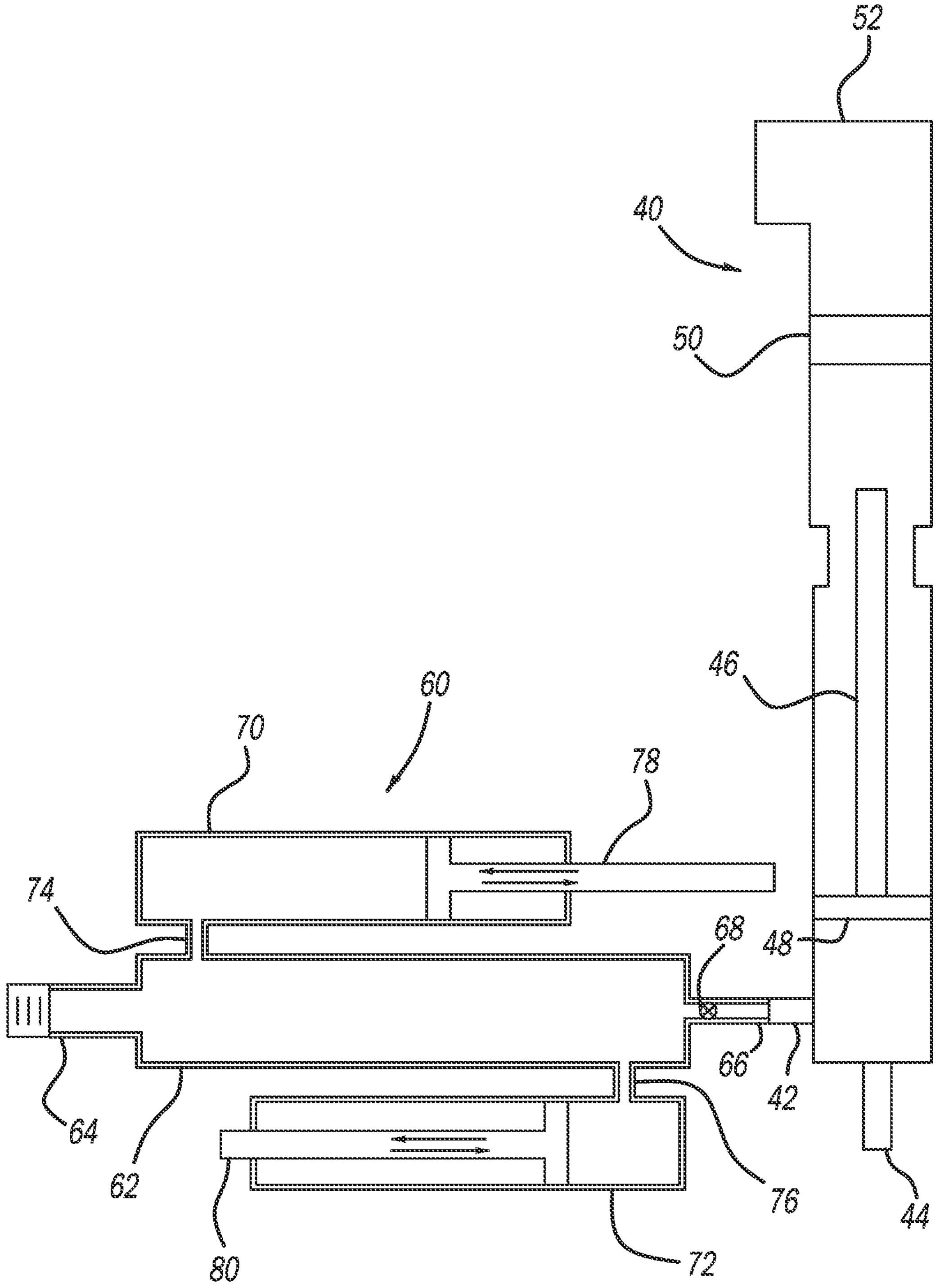
FIG. 2 is a cross-sectional view of a doser and a material conditioning system of the dispensing system of FIG. 1.

The dispensing system 10 further includes a material conditioning assembly 60, which is configured to decrease viscosity of the material to facilitate flow of the material through the dispensing system 10, and deposition of the material at the deposition site by way of the nozzle 30. In the example of FIGS. 1 and 2, the material conditioning assembly 60 is upstream of the doser 40, such that the material passes through the material conditioning assembly 60 prior to reaching the doser 40. In other applications, however, the material conditioning assembly 60 may be downstream of the doser 40, or at any other suitable location about the dispensing system 10.

Figure 3:
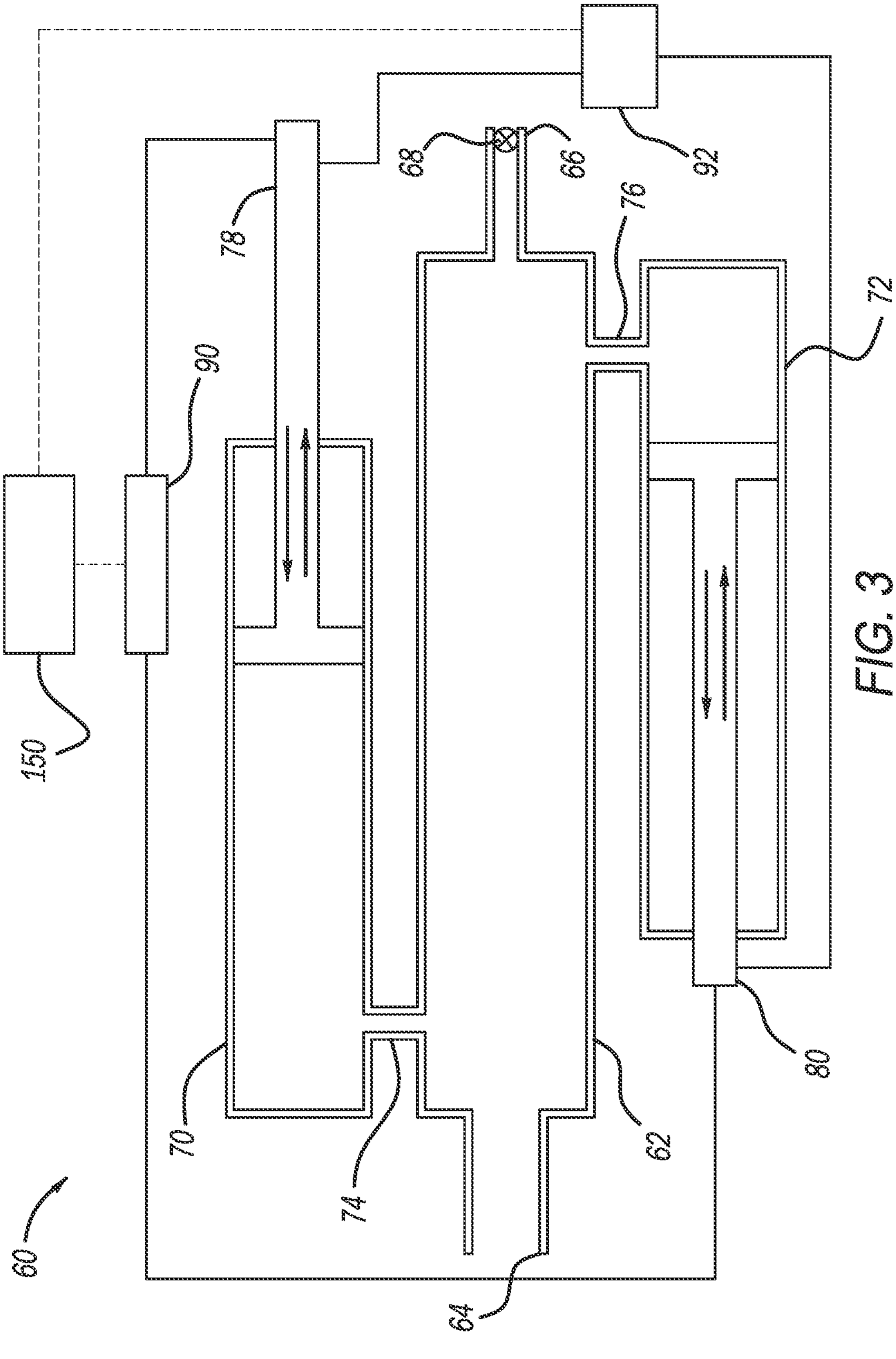
FIG. 3 is a cross-sectional view of the material conditioning system.

With particular reference to FIGS. 2 and 3, the material conditioning assembly 60 generally includes a primary chamber 62, which defines an inlet 64 and an outlet 66. Material to be dispensed is introduced into the primary chamber 62 through the inlet 64, and the material exits through the outlet 66. At the outlet 66 is a stop valve 68, which may be closed to restrict material from exiting the primary chamber 62. In the example illustrated, the material flows from the outlet 66 into the doser 40 through the inlet 42 of the doser 40.

The material conditioning assembly 60 further includes a first conditioning chamber 70 and a second conditioning chamber 72. The first conditioning chamber 70 is connected to the primary chamber 62 by way of a first connector 74, through which the material may flow between the primary chamber 62 and the first conditioning chamber 70. The second conditioning chamber 72 is connected to the primary chamber 62 by way of a second connector 76, through which the material may flow between the primary chamber 62 and the conditioning chamber 72. Although the illustrated configuration includes both the first and second conditioning chambers 70, 72, the material conditioning assembly 60 may be configured to only include one of the first or second conditioning chambers 70, 72, or more than two conditioning chambers 70, 72.

The first conditioning chamber 70 includes a first drive member 78 and the second conditioning chamber 72 includes a second drive member 80. The first and second drive members 78, 80 may be configured in any suitable manner such that actuation thereof creates shearing of the material in the first and second conditioning chambers 70, 72. For example, and as illustrated in the exemplary configurations, the first and second drive members 78, 80 may be configured as pistons. The first and second drive members 78, 80 are movable by any suitable actuator 90, such as any suitable servo motor. A speed sensor 92 is included to measure actuation speed of the first and second drive members 78, 80.

Figure 4A:
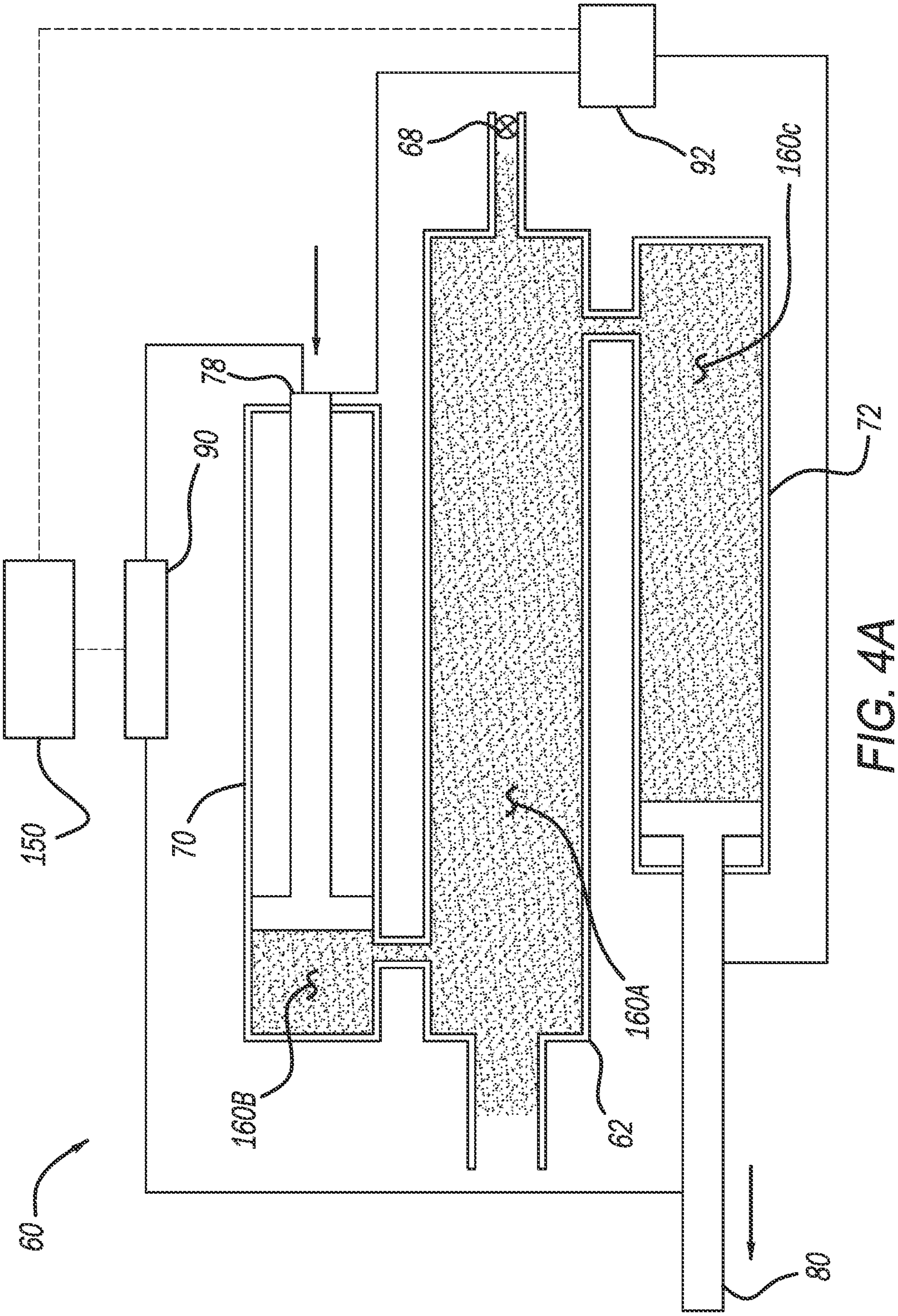
FIG. 4A is a cross-sectional view of the material conditioning system full of a material to be dispensed, and with drive members of the material conditioning system in a first position.
Figure 4B:
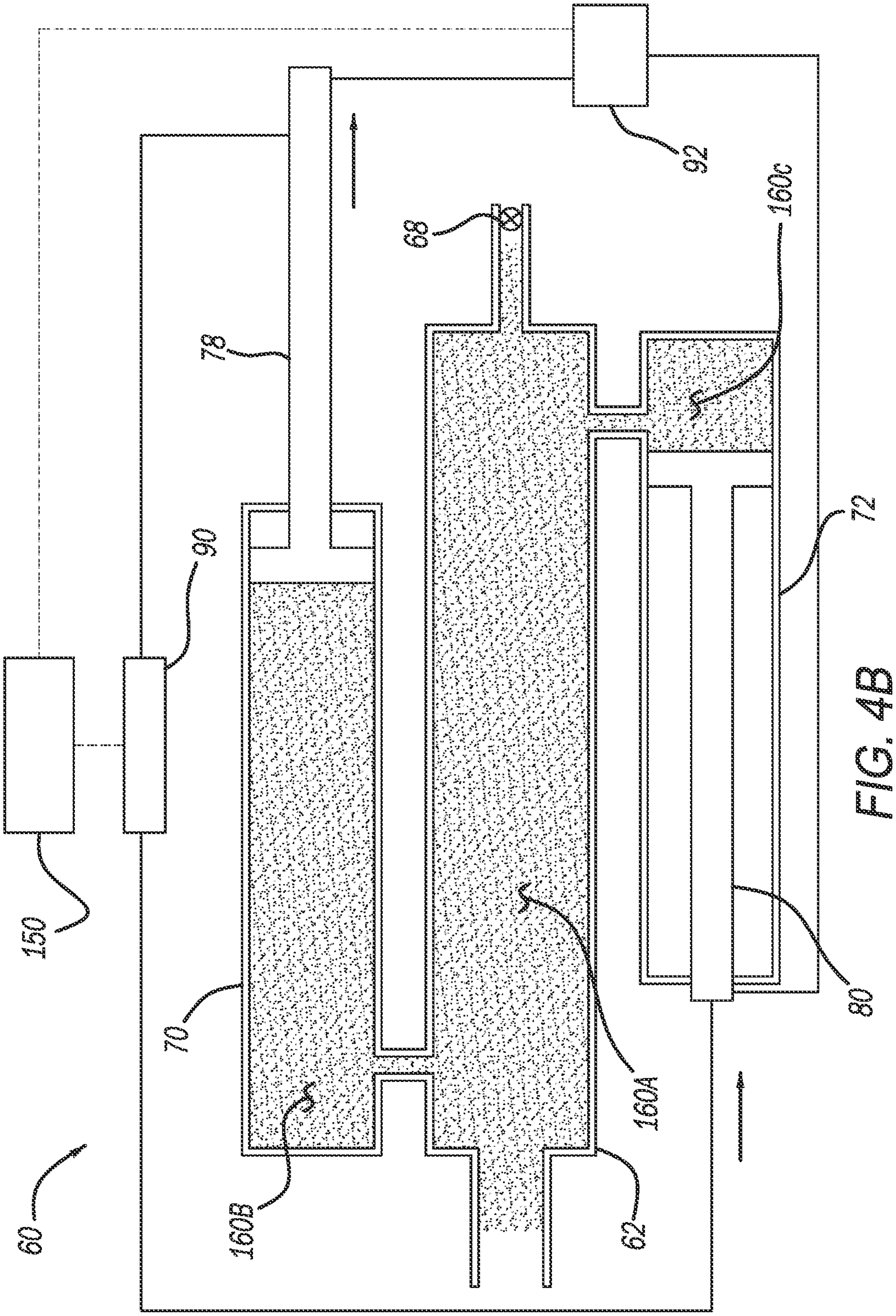
FIG. 4B is a cross-sectional view of the material conditioning system with the drive members in a second position.

With additional reference to FIGS. 4A and 4B, exemplary movement of the first and second drive members 78, 80 by the actuator 90 will now be described. The actuator 90 is configured to simultaneously move the first and second drive members 78, 80 in opposite directions. For example, and as illustrated in FIG. 4A, the first drive member 78 is at a fully extended position extending into the first conditioning chamber 70. The second drive member 80 is at a fully retracted position. The actuator 90 is configured to simultaneously move the first and second drive members 78, 80 in opposite directions from the configuration of FIG. 4A to the configuration of FIG. 4B and vice versa. In the configuration of FIG. 4B, the first drive member 78 is in a fully retracted position, and the second drive member 80 is in a fully extended position.

FIGS. 4A and 4B illustrate the material conditioning assembly full of a material to be dispensed. In the example illustrated, enough of the material is included to completely fill the primary chamber 62. The portion of the material completely filling the primary chamber 62 is labeled with reference numeral 160A. With the stop valve 68 closed, a portion of the material 160B enters the first conditioning chamber 70 through the first connector 74. Another portion of the material 160C enters the second conditioning chamber 72 through the second connector 76. Comparing FIGS. 4A and 4B, upon simultaneous actuation of the first and second drive members 78, 80 in opposite directions by the actuator 90, as the first drive member 78 is retracted and the second drive member 80 is extended, the second drive member 80 pushes the material out from within the second conditioning chamber 72 into the primary chamber 62, which causes material to flow from the primary chamber 62 into the first conditioning chamber 70. Thus, actuation of the first and second drive members 78, 80 to the position of FIG. 4B results in a relatively greater amount of the material 160B in the first conditioning chamber 70, and a relatively smaller amount of the material 160C in the second conditioning chamber 72. Repetitive, simultaneous actuation of the first and second drive members 78, 80 in opposite directions (between the configurations of FIGS. 4A and 4B) circulates the material between the chambers 62, 70, and 72 to apply shear stress to the material, which decreases the viscosity of the material and facilitates dispensing of the material at the nozzle 30.

Figure 5:
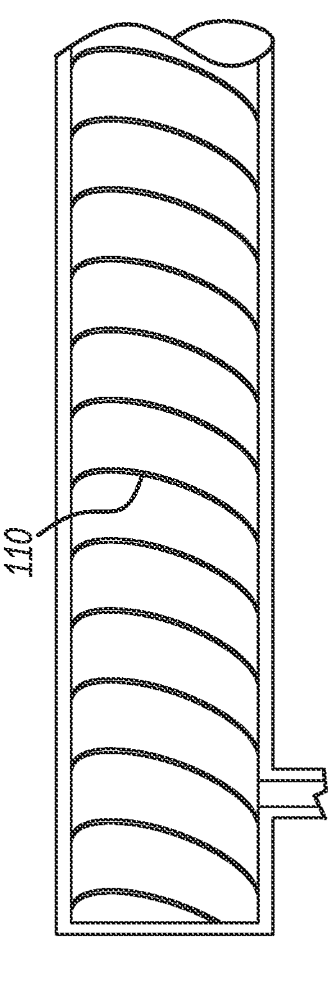
FIG. 5 illustrates helical grooves of an exemplary conditioning chamber of the material dispensing system.

The chambers 62, 70, and 72 may be configured in any suitable manner to apply additional shear stress to the material circulating through the chambers 62, 70, and 72. For example, and as illustrated in FIG. 5, one or more of the chambers 62, 70, and 72 may include helical grooves 110 defined on an inner surface thereof. The helical grooves 110 may be configured in any suitable manner, such as "rifling" grooves, which spiral around the interior surface of one or more of the chambers 62, 70, and 72.

Figure 6:
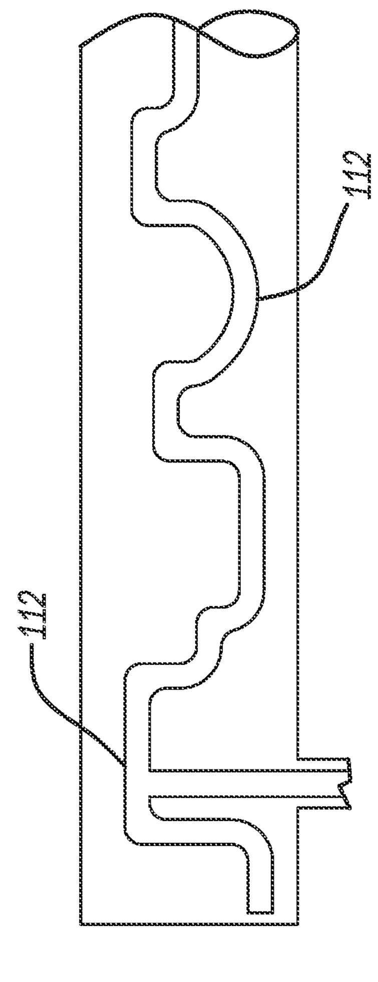
FIG. 6 illustrates another exemplary conditioning chamber for the material dispensing system.
Figure 7:
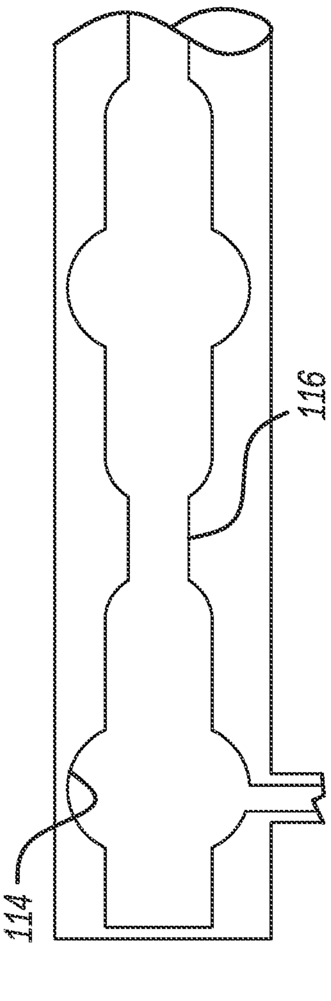
FIG. 7 illustrates yet another exemplary conditioning chamber for the material dispensing system.

The chambers 62, 70, and 72 may be configured in any other suitable additional manner to apply shear stress to the material. For example, and as illustrated in FIG. 6, one or more of the chambers 62, 70, and 72 may be configured as a non-linear chamber including various curved pathways 112. As the material circulates through the curved pathways 112, the material is subject to shear stress, which decreases the viscosity thereof. With reference to FIG. 7, one or more of the chambers 62, 70, and 72 may include a series of relatively wide areas 114 and relatively narrow areas 116. The material is subject to shear stress as it passes between and through the relatively wide areas 114 and relatively narrow areas 116, which decreases the viscosity of the material.

The dispensing system 10 further includes a control module 150. The control module 150 is configured to control the first pump 14 and the second pump 16 for pumping the material out of the storage container 12. The control module 150 is configured to receive signals from the pressure transducer 22 identifying the pressure of the material within the fluid lines 20. The control module 150 controls dispensing of the material out through the nozzle 30 by controlling the doser 40. Specifically, the control module 150 is configured to control the servo 52 of the doser 40, which actuates the displacement rod 46 to dispense the material. The control module 150 receives signals from the flow transducer 34 identifying the flow rate of the material being dispensed through the nozzle 30.

The control module 150 further controls the actuator 90 of the material conditioning assembly 60. The control module 150 is in receipt of signals from the speed sensor 92 identifying the speed at which the first and second drive members 78, 80 are being actuated by the actuator 90. The control module 150 is configured to determine viscosity (or any suitable value that scales with viscosity) of the material within the material conditioning assembly 60 based on the speeds of the drive members 78, 80 and/or the power required by the actuator 90 to move the drive members 78, 80 at the speed indicated by the speed sensor 92. More specifically, the control module 150 can correlate the viscosities of one or more materials with various speeds of the drive members 78, 80 and/or power levels of the actuator 90. The control module 150 is configured to use the speed from the speed sensor 92 and/or the corresponding power consumed by the actuator 90 to estimate the viscosity of the material within the material conditioning assembly 60.

If the determined viscosity is higher than a predetermined target viscosity for the material being dispensed, which is stored in the control module 150, the control module 150 is configured to increase power to the actuator 90 to accelerate the first and second drive members 78, 80 to apply additional shear stress to the material, which will lower the viscosity. Conversely, if the determined viscosity is lower than a predetermined target viscosity stored in the control module, the control module 150 is configured to decrease power to the actuator 90 to decelerate the first and second drive members 78, 80, which will apply less shear stress to the material, which should increase the viscosity.

The control module 150 is further configured to control the servo 52, which actuates the displacement rod 46 of the doser 40. Based on the speed of the displacement rod 46 and/or the power consumed by the servo 52 to move the displacement rod 46, the control module 150 is configured to determine the viscosity of material at the doser 40. Specifically, the control module 150 includes a database of viscosities for the material at different power levels of the servo 52 and actuation speeds of the displacement rod 46. The control module 150 is configured to compare the observed speed of the displacement rod 46 and the power consumed by the servo 52 with the database of speeds and power levels, and identify a best fit match between the database and the observed speed of the displacement rod 46 and power consumed by the servo 52. The control module 150 assigns an observed viscosity corresponding to the database viscosity of the best fit match. The control module 150 is configured to increase power to the servo 52 to actuate the displacement rod 46 with increased force when viscosity of the material within the doser 40 is higher than a predetermined target viscosity in order to dispense the material at a desired speed and quantity. Conversely, the control module is configured to decrease power to the servo 52 to actuate the displacement rod 46 with decreased force when the viscosity of the material at the doser 40 is determined by the control module to be lower than a predetermined target viscosity stored in the control module 150.

The dispensing system 10 is thus configured to dispense a non-Newtonian material, such as an adhesive, at an acceptable viscosity even after the dispensing system 10 has sat idle for a period of time over which viscosity of the material may become undesirably high. The dispensing system 10 is able to self-heal (or self-correct) the rate at which the material is dispensed depending on the viscosity thereof to ensure that the material is dispensed at an acceptable rate and quantity.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A dispensing system for dispensing a material to a deposition point, the dispensing system comprising:
- a nozzle configured to dispense the material;
- a doser in fluid communication with the nozzle, the doser configured to control flow of the material to the nozzle; and
- a material conditioning assembly in fluid communication with the nozzle and configured to decrease viscosity of the material, the material conditioning assembly including:
  - a first conditioning chamber configured to receive the material therein;
  - a first drive member movable within the first conditioning chamber to apply shear stress to the material within the first conditioning chamber;
  - a second conditioning chamber configured to receive the material therein;
  - a second drive member movable within the second conditioning chamber to apply shear stress to the material within the second conditioning chamber;
  - a primary chamber in fluid communication with both the first conditioning chamber and the second conditioning chamber to allow the material to flow between the first conditioning chamber and the second conditioning chamber by way of the primary chamber; and
  - an actuator configured to simultaneously move both the first drive member and the second drive member in opposite directions to apply shear stress to the material.

2. The dispensing system of claim 1, wherein the material conditioning assembly is in fluid communication with the doser and arranged in the dispensing system such that the material flows from the material conditioning assembly to the doser.

3. The dispensing system of claim 1, wherein the first drive member is a piston.

4. The dispensing system of claim 1, wherein:
- the primary chamber is in fluid communication with the doser and a source of the material;
- both the first conditioning chamber and the second conditioning chamber are in fluid communication with the doser by way of the primary chamber; and a stop valve is at an outlet of the primary chamber, the stop valve configured to stop flow of the material to the doser when the stop valve is closed.

5. The dispensing system of claim 1, wherein helical grooves are defined at an inner surface of at least one of the first conditioning chamber and the second conditioning chamber.

6. The dispensing system of claim 1, wherein at least one of the first conditioning chamber and the second conditioning chamber include a curved pathway.

7. The dispensing system of claim 1, further comprising a control module configured to determine viscosity of the material based on speed of the first drive member and power consumed by the actuator to move the first drive member when the first conditioning chamber is full of the material.

8. The dispensing system of claim 7, wherein:

when the determined viscosity is higher than a predetermined target viscosity, the control module is configured to increase power to the actuator to accelerate the first drive member and apply additional shear stress to the material; and when the determined viscosity is lower than the predetermined target viscosity, the control module is configured to decrease power to the actuator to decelerate the first drive member and apply less shear stress to the material.

9. A dispensing system for dispensing a material to a deposition point, the dispensing system comprising:

a nozzle configured to dispense the material;

a doser in fluid communication with the nozzle, the doser including a displacement rod and a motor configured to move the displacement rod to control flow of the material to the nozzle;

a material conditioning assembly upstream of the doser such that the material flows from the material conditioning assembly to the doser, the material conditioning assembly including:

a first conditioning chamber configured to receive the material therein;

a second conditioning chamber;

a first drive member movable within the first conditioning chamber to apply shear stress to the material within the first conditioning chamber;

a second drive member movable within the second conditioning chamber to apply shear stress to the material within the second conditioning chamber;

a primary chamber in fluid communication with both the first conditioning chamber and the second conditioning chamber to allow the material to flow between the first conditioning chamber and the second conditioning chamber by way of the primary chamber; and an actuator configured to simultaneously move both the first drive member and the second drive member in opposite directions to apply shear stress to the material; and a control module configured to determine viscosity of the material based on speed of the first drive member and power consumed by the actuator to move the first drive member when the first conditioning chamber is full of the material;

wherein when the viscosity determined by the control module is higher than a predetermined target viscosity, the control module is configured to increase power to the actuator to accelerate the first drive member to apply additional shear stress to the material.

10. The dispensing system of claim 9, wherein:

the control module is configured to increase power to the motor to actuate the displacement rod with increased force when the viscosity of the material determined by the control module is higher than the predetermined target viscosity; and the control module is configured to decrease power to the motor to actuate the displacement rod with decreased force when the viscosity of the material determined by the control module is lower than the predetermined target viscosity.

11. The dispensing system of claim 9, wherein:

the primary chamber is in fluid communication with the doser and a source of the material;

both the first conditioning chamber and the second conditioning chamber are in fluid communication with the doser by way of the primary chamber; and a stop valve is at an outlet of the primary chamber, the stop valve configured to stop flow of the material to the doser when the stop valve is closed.

12. The dispensing system of claim 9, wherein helical grooves are defined at an inner surface of at least one of the first conditioning chamber and the second conditioning chamber.

13. A dispensing system for dispensing a material to a deposition point, the dispensing system comprising:

a nozzle configured to dispense the material;

a doser in fluid communication with the nozzle, the doser configured to control flow of the material to the nozzle;

a material conditioning assembly upstream of the doser such that the material flows from the material conditioning assembly to the doser, the material conditioning assembly including:

a first conditioning chamber and a first drive member movable within the first conditioning chamber to apply shear stress to the material within the first conditioning chamber;

a second conditioning chamber and a second drive member movable within the second conditioning chamber to apply shear stress to the material within the second conditioning chamber;

an actuator configured to simultaneously move the first drive member and the second drive member in opposite directions to apply shear stress to the material;

a primary chamber in fluid communication with both the first conditioning chamber and the second conditioning chamber to allow the material to flow between the first conditioning chamber and the second conditioning chamber by way of the primary chamber, the primary chamber is in fluid communication with the doser and a source of the material; and a stop valve at an outlet of the primary chamber, the stop valve configured to stop flow of the material to the doser when the stop valve is closed.

14. The dispensing system of claim 13, wherein:

a control module is configured to determine viscosity of the material based on speed of the first drive member, speed of the second drive member, and power consumed by the actuator to move the first drive member and the second drive member when the material conditioning assembly is full of the material; and when the determined viscosity is higher than a predetermined target viscosity, the control module is configured to increase power to the actuator to accelerate the first drive member and the second drive member to apply additional shear stress to the material.

15. The dispensing system of claim 14, wherein:

the doser includes a displacement rod and a motor configured to move the displacement rod to control flow of the material to the nozzle;

the control module is configured to increase power to the motor to actuate the displacement rod with increased force when the viscosity of the material determined by the control module is higher than the predetermined target viscosity; and the control module is configured to decrease power to the motor to actuate the displacement rod with decreased force when the viscosity of the material determined by the control module is lower than the predetermined target viscosity.

* * * * *